(12) United States Patent
Todd

(10) Patent No.: US 9,047,569 B2
(45) Date of Patent: Jun. 2, 2015

(54) GENETIC OPTIMIZATION METHOD AND SYSTEM

(75) Inventor: Stephen James Todd, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 922 days.

(21) Appl. No.: 10/995,685

(22) Filed: Nov. 23, 2004

(65) Prior Publication Data

US 2005/0119981 A1  Jun. 2, 2005

(30) Foreign Application Priority Data

Nov. 29, 2003  (GB) .................................. 0327820.7

(51) Int. Cl.
*G06N 3/12* (2006.01)
(52) U.S. Cl.
CPC ...................................... *G06N 3/126* (2013.01)
(58) Field of Classification Search
USPC ............................................. 706/13; 703/14
See application file for complete search history.

(56) References Cited

U.S. PATENT DOCUMENTS

| | | | | |
|---|---|---|---|---|
| 5,148,513 | A | 9/1992 | Koza et al. ...................... | 395/13 |
| 5,867,397 | A * | 2/1999 | Koza et al. ...................... | 703/14 |
| 5,926,803 | A * | 7/1999 | Kitano ............................. | 706/13 |
| 5,940,816 | A * | 8/1999 | Fuhrer et al. ................... | 706/13 |
| 2002/0133797 | A1 | 9/2002 | Sasagawa et al. ............... | 716/9 |

FOREIGN PATENT DOCUMENTS

| | | | | |
|---|---|---|---|---|
| CN | 1450493 A | 10/2003 | ............... | G06N 3/12 |
| EP | 1205863 A1 | 5/2002 | ............... | G06F 17/60 |

OTHER PUBLICATIONS

Kasat, et al., Multi-objective optimization of an industrial fluidized-bed catalytic cracking unit (FCCU) using genetic algorithm (GA) with the jumping genes operator, Computers and Chemical Engineering 27, 2003, pp. 1785-1800.*
Rubenstein-Montano, et al., A Weighted Sum Genetic Algorithm to Support Multiple-Party Multiple-Objective Negotiations, IEEE Transactions on Evolutionary Computation, vol. 6, No. 4, Aug. 2002, pp. 366-377.*
"An Improved Genetic Algorithm in Multi-Objective Optimization" Natural Science Edition, Journal of South China University of Technology, vol. 29, No. 12, Dec. 31, 2001 (Abstract attached).
Cardon, Alain, Thierry Calinho, Jean-Philippe Vacher "Genetic Algorithms Using Multi-Objectives in a Multi-Agent System" *Robotics and Autonomous Systems*, vol. 33, 2000, pp. 179-190.

(Continued)

*Primary Examiner* — Wilbert L Starks
(74) *Attorney, Agent, or Firm* — Terrile, Cannatti, Chambers & Holland, LLP; Stephen A. Terrile

(57) ABSTRACT

A multi-objective optimization method. The method comprises a population of objects for each objective utilizing an optimization process and determining a measure for the variation in values of each gene within each population. A crossbreed between objects from different ones of the populations is performed, wherein a selection of gene values for the child object is weighted based on the measures for the variations in the values of each gene within the respective populations.

21 Claims, 2 Drawing Sheets

(56) References Cited

OTHER PUBLICATIONS

Deb, Kalyanmoy "Evolutionary Algorithms for Multi-Criterion Optimization in Engineering Design," in Kaisa Miettinen, Marko M. Makela, Pekka Neittaanmaki, and Jacques Periaux, editors, *Evolutionary Algorithms in Engineering and Computer Science*, Chapter 8, pp. 135-161, John Wiley & Sons, Ltd, Chichester, UK 1999.
Lucas, Chris "Practical Multiobjective Optimisation" http://www.calresco.org/lucas/pmo.htm, Version 4.83, Apr. 2006, (Paper V1.1, Original Mar. 2002).

* cited by examiner

US 9,047,569 B2

GENETIC OPTIMIZATION METHOD AND SYSTEM

FIELD OF THE INVENTION

The present invention relates broadly to a multi-objective optimization method and system.

BACKGROUND

Genetic algorithms are a standard technique for optimization processes. They are increasingly being used for "subjective" optimization where the goal (or objective or cost function) is determined by a user making "I like it" decisions. Typically, most optimization processes involve more than one objective Thus, there is now a large body of work on Evolutionary Multi-Objective Optimization (EMOO).

One way to work with multiple objectives is to evolve populations to optimize each objective independently, and to then crossbreed between the optimized populations. In one approach, each crossbreed is bred from one parent from each independently optimized population, for example one parent from an A-optimized population and one parent from a B-optimized population in a two parent scenario.

In that approach, however, many of the crossbred children are likely to have none of the carefully bred characteristics of their parents. While this is not too important where both functions A and B are numeric, as the crossbreeds can quickly and automatically be evaluated and inappropriate ones eliminated, in optimization problems where either or both A or B are subjective functions, this pre-evaluation of crossbreeds requires human judgment and thus time and potentially inhibitive effort. It is therefore desirable to reduce the likelihood of crossbred children having none of the bred characteristics of their parents in such optimization problems.

SUMMARY

In accordance with a first aspect of the present invention there is provided a multi-objective optimisation method. The method comprises a population of objects for each objective utilising an optimisation process and determining a measure for the variation in values of each gene within each population. A crossbreed between objects from different ones of the populations is performed, wherein a selection of gene values for the child object is weighted based on the measures for the variations in the values of each gene within the respective populations.

Suitably, the measure for the variation in the values of each gene within each populations is the standard deviation of the values.

In accordance with a second aspect of the present invention there is provided a multi-objective optimisation system. The system comprises an optimisation unit for determining a population of objects for each objective utilising an optimisation process, and a processing unit for determining a measure for the variation in values of each gene within each population. The system further comprises a crossbreeding unit for performing a crossbreed between objects from different ones of the populations, wherein a selection of gene values for the child object is weighted based on the measures for the variations in the values of each gene within the respective populations.

In accordance with a third aspect of the present invention there is provided a computer program, recorded on a medium, for instructing a computer to conduct a multi-objective optimisation method. The method comprises determining a population of objects for each objective utilising an optimisation process, and determining a measure for the variation in values of each gene within each population. The method further comprises performing a crossbreed between objects from different ones of the populations, wherein a selection of gene values for the child object is weighted based on the measures for the variations in the values of each gene within the respective populations.

DESCRIPTION OF DRAWINGS

Preferred embodiments of the present invention will now be described, by way of example only, with reference to the accompanying drawings.

DETAILED DESCRIPTION

The preferred embodiments described provide a multi-objective optimization method and system in which the likelihood of crossbred children from parents of independently optimized populations having none of the characteristics of their parents is reduced.

Figure 1:
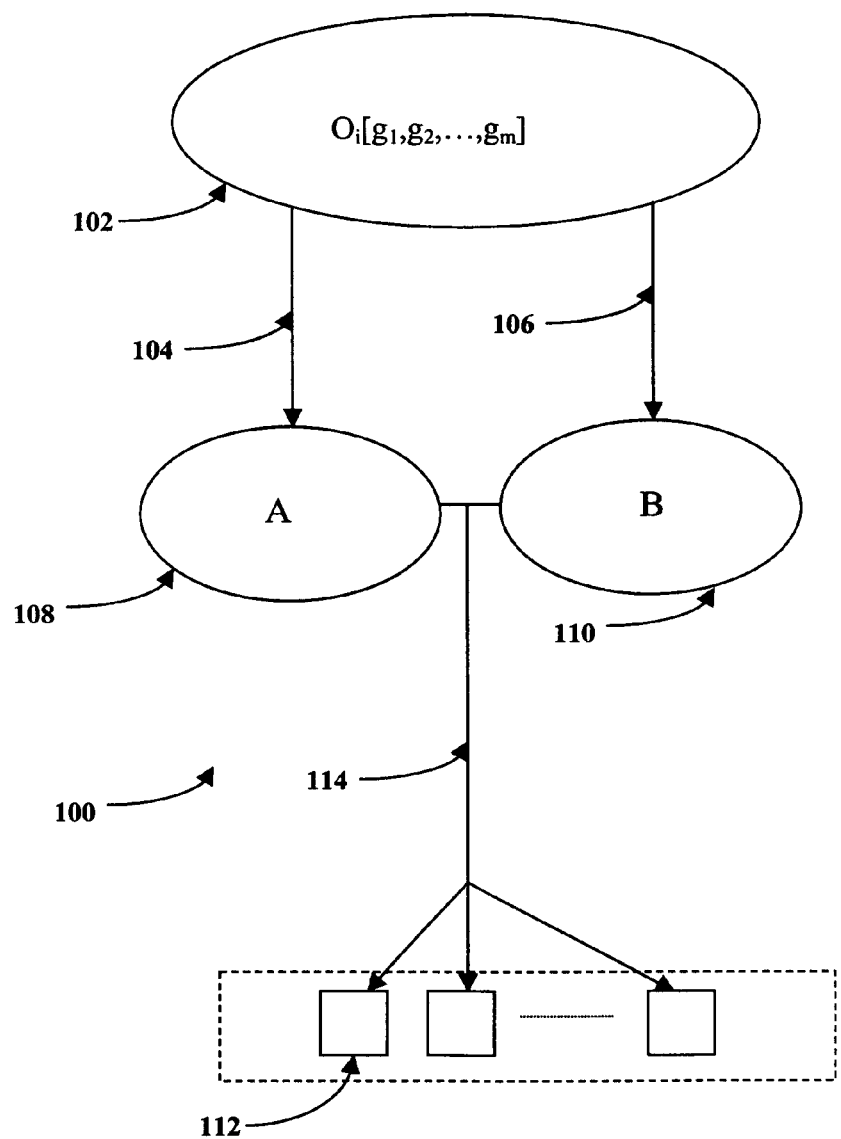
FIG. 1 is a schematic representation of an EMOO problem flow.

FIG. 1 shows a schematic diagram illustrating an EMOO problem flow 100 in an example embodiment. An object pool 102 represents all of the possible objects or states in a multi-variables or multi-genes space. Each object O is defined by a set of m genes $g_1, \ldots, g_m$.

Two independent functions indicated at numerals 104 and 106 respectively in the set of gene values are being optimized, yielding respective populations 108, 110 respectively. Each population 108, 110 is a sub-set of objects from the object pool 102, with all of the members of each population satisfying a particular optimization criterion or criteria.

One or more objects from each of the populations 108, 110 are then used as parents for crossbreeding one or more child objects, eg. child 112. From the group of children eg. 112, one or more are selected in a "subjective" optimization step, either for undergoing further optimization processes, or as "final" selection of the overall optimization.

In order to reduce the likelihood of any of the child objects eg. 112 having none of the characteristics of their parents, which have previously been optimized (compare processing at numerals 104, 106 described above), the crossbreed process indicated at numeral 114 is weighted. The weighting is based on a measure for the variation in the value of each gene within the respective parent populations 108, 110, in the example embodiment. More particularly, at a first stage in the crossbreeding step 114, for each gene and for each population the standard deviation of the gene value within the respective populations 108, 110 is determined. Thus, eg. for population A, and gene $g_n$, we establish SD $(A, g_n)$. [$g_n$ is a gene in the range $g_1$ to $g_m$.]

It has been recognised by the inventor that a small variation in a gene value, such as a small standard deviation SD $(A, g_n)$, indicates a gene $g_n$ preferentially selected during the optimization leading to the population A. It has further been recognised that utilizing such a measure of the variation in a value of each gene within each population to perform a weighted crossbreeding can increase the likelihood of that gene being present in the resulting child. It is noted that while the standard deviation in the example embodiment does not have an absolute meaning in the context of the optimization process, it can be compared between populations and thus can be used in a weightening function during the crossbreeding stage.

For an individual crossbreed child OX of parent OA from population A and parent OB from population B, a probability of taking gene $g_n$ from OA is calculated as $$\text{prob}A(g_n) = SD(B, g_n)/(SD(A, g_n) + SD(B, g_n)) \quad (1)$$

in the example embodiment. $\text{ProbA}(g_n)$ may be viewed as a desirability to take $g_n$ from OA, i.e. it is higher for the population with the lower SD for $g_n$.

Gene(OX, $g_n$)=rnd<probA($g_n$) ? gene(OA, $g_n$): gene(OB, $g_n$) is then chosen where rnd is a random number in range 0 ... 1. As a result, the likelihood of taking $g_n$ from the parent for which $g_n$ was preferentially selected in the optimization leading to the parent population is increased. In the generation of each child, this process is repeated for each gene. This outer process is repeated for each crossbreed required.

There are independent choices for how to identify each population, and which parents to use from the population. One choice in Mutator optimization, in an example embodiment, can be to use the complete current displayed population on a Mutator to establish SD, and to use identified "good" objects as potential parents. Details of the Mutator optimization process are described in published European Patent Application No. 94303661.6, publication number 0623918A2 in the name of the present applicant, the contents of which are hereby incorporated by cross reference.

It is possible in another embodiment, to use several parents for a single crossbreed, some from each population. In this case, for each gene $g_n$, a source population is first selected based on equation (1), and then particular parents from the appropriate population are selected.

It is possible, in another modified example embodiment, to generalize the crossbreeding stage for crossbreed between several populations, eg the k populations $P_1, P_2, \ldots, P_k$. In such an embodiment, the probability of taking gene $g_n$ from parent $OP_i$ may be calculated as $$\text{prob}P_i(g_n) = [1/SD(P_i, g_n)]/\{[1/SD(P_1, g_n)] + \ldots + [1/SD(P_k, g_n)]\} \quad (1a)$$

It is noted that though equation (1a) has a different form from equation (1) it is actually equivalent for the case k=2.

Equation (1) can be weighted towards one population or the other using WA and WB, $$\text{prob}A(g_n) = WB*SD(B, g_n)/(WA*SD(A, g_n) + WB*SD(B, g_b)) \quad (2)$$

in another example embodiment. Where several crossbreeds are to be generated at once, a spread of WA/WB values may be used, with different values for each crossbreed. This is expected to naturally lead to user selection of the most appropriate weightings.

Equation (1) can be weighted to be more or less extreme by weight K, $$\text{prob}A(g_n) = SD(B, g_n)^K/(SD(A, g_n)^K + SD(B, g_n)^K \quad (3)$$

in another example embodiment. This technique may be used in particular:
1. Where one user breeds for different features, and judges the crossbreeds.
2. Where different users breed for different features, and then collaborate to judge the crossbreeds.
3. Where one feature is bred by user selection and one by mathematical optimization, and the user judges the crossbreeds.

Figure 2:
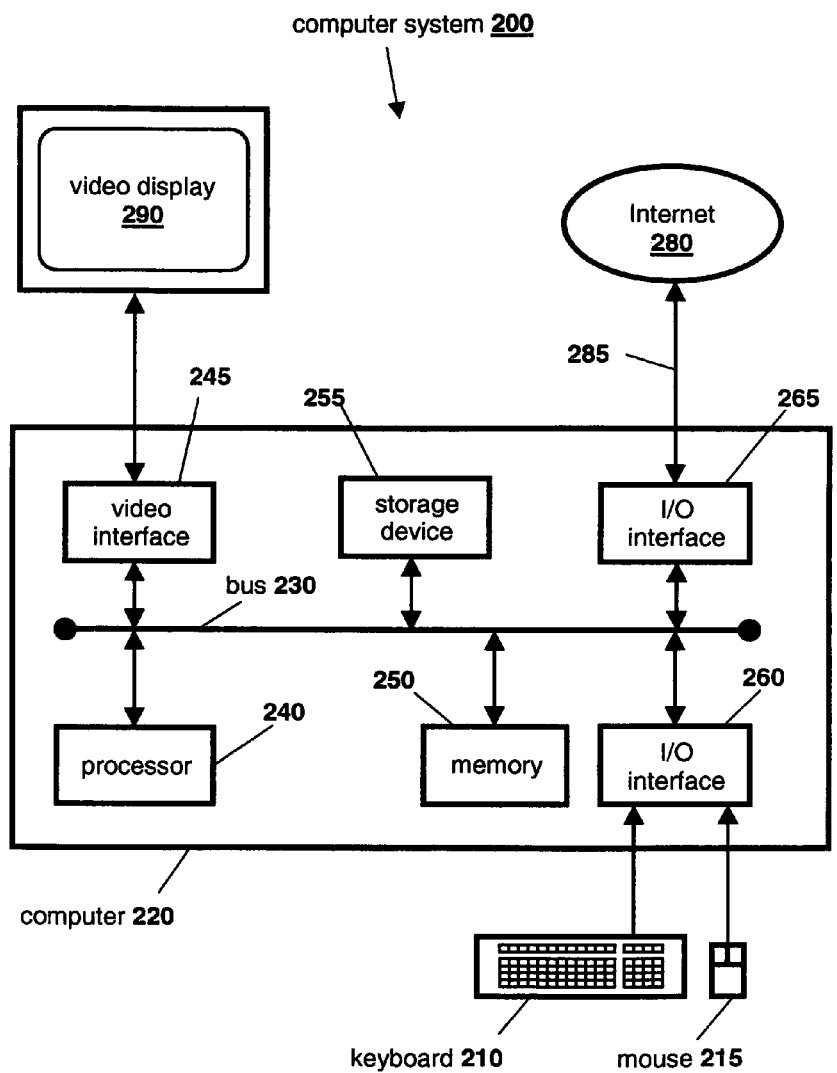
FIG. 2 is a schematic representation of a computer system suitable for performing the techniques described with reference to FIG. 1.

FIG. 2 is a schematic representation of a computer system 200 that can be used to implement the techniques described herein. Computer software executes under a suitable operating system installed on the computer system 200 to assist in performing the described techniques. This computer software is programmed using any suitable computer programming language, and may be thought of as comprising various software code means for achieving particular steps.

The components of the computer system 200 include a computer 220, a keyboard 210 and mouse 215, and a video display 290. The computer 220 includes a processor 240, a memory 250, input/output (I/O) interfaces 260, 265, a video interface 245, and a storage device 255.

The processor 240 is a central processing unit (CPU) that executes the operating system and the computer software executing under the operating system. The memory 250 includes random access memory (RAM) and read-only memory (ROM), and is used under direction of the processor 240.

The video interface 245 is connected to video display 290 and provides video signals for display on the video display 290. User input to operate the computer 220 is provided from the keyboard 210 and mouse 215. The storage device 255 can include a disk drive or any other suitable storage medium.

Each of the components of the computer 220 is connected to an internal bus 230 that includes data, address, and control buses, to allow components of the computer 220 to communicate with each other via the bus 230.

The computer system 200 can be connected to one or more other similar computers via a input/output (I/O) interface 265 using a communication channel 285 to a network, represented as the Internet 280.

The computer software may be recorded on a portable storage medium, in which case, the computer software program is accessed by the computer system 200 from the storage device 255. Alternatively, the computer software can be accessed directly from the Internet 280 by the computer 220. In either case, a user can interact with the computer system 200 using the keyboard 210 and mouse 215 to operate the programmed computer software executing on the computer 220.

Other configurations or types of computer systems can be equally well used to implement the described techniques. The computer system 200 described above is described only as an example of a particular type of system suitable for implementing the described techniques.

It will be appreciated by a person skilled in the art that embodiments of the present inventions have applications in a large variety of optimisation problems, including, but not limited to, in the interaction between autonomic and interactive control of computer systems, e.g. placement of processes and data, control of bandwidth, allocation of computer power; in drug modelling; and in financial modelling.

Various alterations and modifications can be made to the techniques and arrangements described herein, as would be apparent to one skilled in the relevant art. For example, it will be appreciated that other measures for the variations in the values of each gene in the respective populations than SD may be used in other embodiment.

What is claimed is:
1. A computer implemented multi-objective optimization method to reduce a likelihood of crossbred children from parents of independently optimized populations having no characteristics of either parent, the method comprising the steps of:
  determining, via a computer system, a population of objects for each objective utilizing an optimization process, determining, via the computer system, a measure for the variation in values of each gene within each population, and performing, via the computer system a crossbreed between objects from different ones of the populations, wherein a selection of gene values for the child object is weighted based on the measures for the variations in the values of each gene within the respective populations, the crossbreed providing the multi-objective optimization to reduce the likelihood of crossbred children from parents of independently optimized populations having no characteristics of either parent.

2. A method as claimed in claim 1, wherein the measure for the variation in the values of each gene within each populations is the standard deviation of the values.

3. A method as claimed in claim 1, wherein the step of performing the crossbreed comprises further weighting of the selection of gene values based on other weighting factors associated with the respective parent populations.

4. A method as claimed in claim 1, wherein a further weight parameter to make the weighting more or less extreme is used in the weighting of the selection of gene values based on the measures for the variations in the values of each gene within the respective populations.

5. A method as claimed in claim 1, wherein the method comprises the step of selecting objects for the crossbreeding based on human input.

6. A method as claimed in claim 1, wherein the crossbreed is performed from more than two objects, and the method further comprises the step of selecting, for each gene, one population based on the measures for the variations in the values of each gene within the respective populations, and then selecting a particular object from said one population.

7. A method as claimed in claim 6, wherein the selecting of the particular object is based on human input.

8. A multi-objective optimization system to reduce a likelihood of crossbred children from parents of independently optimized populations having no characteristics of either parent, the optimization system comprising:

a optimization unit for determining a population of objects for each objective utilizing an optimization process, a processing unit for determining a measure for the variation in values of each gene within each population, and a crossbreeding unit for performing a crossbreed between objects from different ones of the populations, wherein a selection of gene values for the child object is weighted based on the measures for the variations in the values of each gene within the respective populations, the crossbreed providing the multi-objective optimization to reduce the likelihood of crossbred children from parents of independently optimized populations having no characteristics of either parent.

9. A system as claimed in claim 8, wherein the measure for the variation in the values of each gene within each populations is the standard deviation of the values.

10. A method as claimed in claim 8, wherein the crossbreeding unit further weights the selection of gene values based on other weighting factors associated with the respective parent populations.

11. A system as claimed in claim 8, wherein the crossbreeding unit uses a further weight parameter to make the weighting more or less extreme in the weighting of the selection of gene values based on the measures for the variations in the values of each gene within the respective populations.

12. A system as claimed in claim 8, wherein the system comprises an interface unit for selecting objects for the crossbreeding based on human input.

13. A system as claimed in claim 8, wherein the crossbreeding unit performs the crossbreed from more than two objects and selects, for each gene, one population based on the measures for the variations in the values of each gene within the respective populations and selects a particular object from said one population.

14. A system as claimed in claim 13, wherein the crossbreeding unit selects the particular object based on human input received through an interface unit of the system.

15. A non-transitory computer program for instructing a computer to conduct a multi-objective optimization method to reduce a likelihood of crossbred children from parents of independently optimized populations having no characteristics of either parent, the method comprising the steps of:

determining a population of objects for each objective utilizing an optimization process, determining a measure for the variation in values of each gene within each population, and performing a crossbreed between objects from different ones of the populations, wherein a selection of gene values for the child object is weighted based on the measures for the variations in the values of each gene within the respective populations, the crossbreed providing the multi-objective optimization to reduce the likelihood of crossbred children from parents of independently optimized populations having no characteristics of either parent.

16. A computer program as claimed in claim 15, wherein the measure for the variation in the values of each gene within each populations is the standard deviation of the values.

17. A computer program as claimed in claim 15, wherein the step of performing the crossbreed comprises further weighting of the selection of gene values based on other weighting factors associated with the respective parent populations.

18. A computer program as claimed in claim 15, wherein a further weight parameter to make the weighting more or less extreme is used in the weighting of the selection of gene values based on the measures for the variations in the values of each gene within the respective populations.

19. A computer program as claimed in claim 15, wherein the method comprises the step of selecting objects for the crossbreeding based on human input.

20. A computer program as claimed in claim 15, wherein the crossbreed is performed from more than two objects, and the method further comprises the step of selecting, for each gene, one population based on the measures for the variations in the values of each gene within the respective populations, and then selecting a particular object from said one population.

21. A computer program as claimed in claim 20, wherein the selecting of the particular object is based on human input.

* * * * *